United States Patent [19]
Chito

[11] Patent Number: 4,914,534
[45] Date of Patent: Apr. 3, 1990

[54] INFORMATION REPRODUCING APPARATUS HAVING A TIMER FOR RESTRICTING OPERATION THEREOF AND MEANS FOR OVERRIDING SAID TIMER WHEN THE INFORMATION REPRODUCING APPARATUS IS OPERATIVELY COUPLED TO A REPRODUCED INFORMATION HANDLING APPARATUS

[75] Inventor: Yasuo Chito, Saitama, Japan

[73] Assignee: Canon Kabushiki Kaisha, Tokyo, Japan

[21] Appl. No.: 136,475

[22] Filed: Dec. 23, 1987

Related U.S. Application Data

[63] Continuation of Ser. No. 567,546, Jan. 3, 1984, abandoned.

[30] Foreign Application Priority Data

Jan. 7, 1983 [JP] Japan ..................................... 58-974

[51] Int. Cl.⁴ ........................ G11B 5/09; G11B 15/04; G11B 15/02; G11B 15/03
[52] U.S. Cl. ...................................... 360/69; 360/79; 360/60; 369/19
[58] Field of Search ..................... 369/19, 20; 360/60, 360/12, 69, 79; 364/200

[56] References Cited

U.S. PATENT DOCUMENTS 2,984,490  5/1961  Mueller ................................. 369/19
3,828,325  8/1974  Stafford et al. ..................... 364/200
3,889,290  6/1975  Seaton .................................. 369/19
4,015,090  3/1977  Kitada ............................... 369/19 X
4,086,659  4/1978  Cizmic et al. ..................... 360/78 X
4,090,239  5/1978  Twibell et al. ..................... 364/200
4,105,866  8/1978  Henehan et al. ............... 179/6.15 X
4,159,516  6/1979  Henrion et al. ..................... 364/200

FOREIGN PATENT DOCUMENTS 2131890   8/1978  Fed. Rep. of Germany ..... 179/6.15
53-148307 12/1978  Japan .................................. 179/6.15

OTHER PUBLICATIONS

IBM-TDB vol. 14 No. 6 Nov.'71 by Maddox Voice Burst Tone Detector p. 1789.
Leibson "The Handbook of Microcomputer Interfacing" 1983, pp. 98-101.

Primary Examiner—Stuart N. Hecker
Assistant Examiner—Alyssa H. Bowler
Attorney, Agent, or Firm—Toren, McGeady & Associates

[57] ABSTRACT

The disclosed information reproducing apparatus reproduces information recorded on a record medium. A timer system restricts the reproducing operation of the apparatus to a predetermined period of time and a control facility controls the timer system on the basis of the coupled state or operating state of a reproduced information handling apparatus arranged to handle reproduced information.

10 Claims, 4 Drawing Sheets

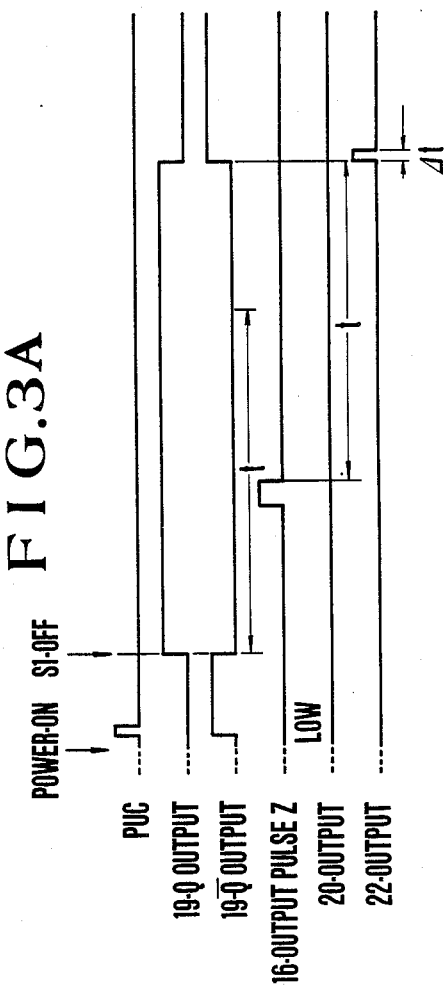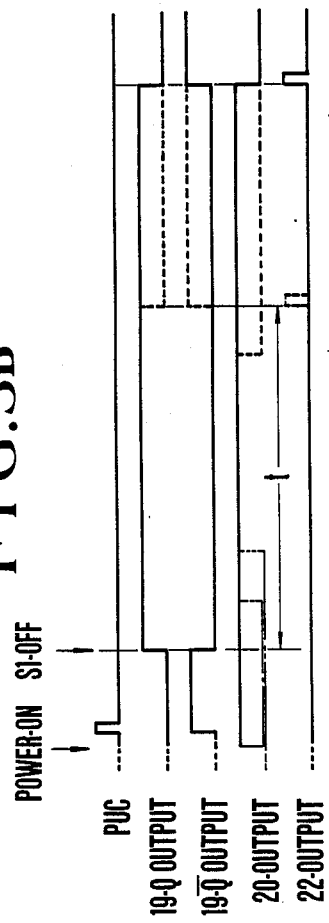

INFORMATION REPRODUCING APPARATUS HAVING A TIMER FOR RESTRICTING OPERATION THEREOF AND MEANS FOR OVERRIDING SAID TIMER WHEN THE INFORMATION REPRODUCING APPARATUS IS OPERATIVELY COUPLED TO A REPRODUCED INFORMATION HANDLING APPARATUS

This is a continuation of application Ser. No. 567,546, filed Jan. 3, 1984 now abandoned.

BACKGROUND OF THE INVENTION:

1. Field Of The Invention:

This invention relates to an information reproducing apparatus which reproduces information recorded on a recording medium and more particularly to an information reproducing apparatus of the kind capable of repeatedly and continuously reproducing information from one recording track on the recording medium.

2. Description Of The Prior Art:

An information reproducing apparatus may, for example, use a magnetic sheet with concentrically formed recording tracks. For protection of the magnetic sheet it is necessary to avoid repeatedly tracing one and the same recording track with a reproducing head for longer than a given period of time. The same limitation applies to a video tape player when reproducing a still picture.

In one conceivable apparatus for meeting this requirement, a timer arranged within a reproducing apparatus begins timing when the system starts continuous repetitive reproduction on one and the same recording track. After lapse of a predetermined time set at the timer, either the repetitive reproducing operation is stopped or the reproducing operation is shifted to another track.

However, such a method raises another problem where the reproducing apparatus is coupled with a reproduced signal handling apparatus such as a printer or an electric transmission apparatus. In such a case, if the continuous repetitive tracking operation on the same recording track is stopped due to the lapse of the time defined by the timer before the reproduced signal handling apparatus completes a necessary procedure, the supply of the reproduced signal to the handling apparatus ends halfway through the operation. This disturbs the output of the handling apparatus.

SUMMARY OF THE INVENTION:

It is therefore a general object of the present invention to provide a novel information reproducing apparatus which can repeatedly and continuously reproduce information from one recording track on a recording medium and is capable of obviating the above-stated problem of prior art apparatuses.

It is a more specific object of the invention to provide an information reproducing apparatus which can repeatedly and continuously reproduce information from one recording track on a recording medium and permits use of a reproduced information handling apparatus in combination therewith and which is not only capable of effectively preventing the wear and tear of the recording medium but also ensures a satisfactory operation of the reproduced information handling apparatus.

It is another object of the invention to provide a novel information reproducing and processing system which is composed of an information reproducing apparatus for repeatedly and continuously reproducing information from one recording track on a recording medium and an apparatus for handling the reproduced information thus obtained and which is not only capable of effectively preventing the wear and tear of the recording medium but also ensures a satisfactory output of the reproduced information handling apparatus.

With these objects, an information reproducing apparatus or an information reproducing and processing system composed of the information reproducing apparatus and a reproduced information handling apparatus, embodying the invention and representing an aspect thereof, comprises timer means which restricts a reproducing operation of the reproducing apparatus within a predetermined period of time; and control means for controlling the timer means according to the coupled state or operating state of the reproduced information handling apparatus.

The information reproducing apparatus and the reproduced information handling apparatus of course can be either arranged as one unit or arranged as discrete units.

The time means can be included either in the system control part of the information reproducing apparatus or in the central processing unit of a common system control portion arranged for both the information reproducing apparatus and the reproduced information handling apparatus.

In accordance with the invention, the timer means for restricting the reproducing operation of the apparatus is arranged to be controlled according to the coupled state of the reproduced information handling apparatus or the operating state thereof. In case that one and the same recording track on the recording medium is continuously and repeatedly reproduced by the information reproducing apparatus, this arrangement prevents the wear and tear of the recording medium that tends to occur due to tracing of the same recording track with a reproducing head for a period of time longer than a predetermined period. It also prevents the reproduced information handling apparatus from being disturbed or disabled by interruption of reproduced information occurring while it is in a coupled state or while it is in operation These and further objects and features of the invention will become apparent from the following detailed description of preferred embodiments thereof taken in connection with the accompanying drawings.

BRIEF DESCRIPTION OF THE DRAWINGS:

The accompanying drawings show preferred embodiments of the present invention.

FIG. 3A is a timing chart showing the operation of the information reproducing apparatus shown in FIG. 2 when the apparatus operates individually.

FIG. 3B is a timing chart showing the operation of the information reproducing apparatus shown in FIG. 2 when the apparatus operates in combination with the reproduced information handling apparatus.

Figure 1A:
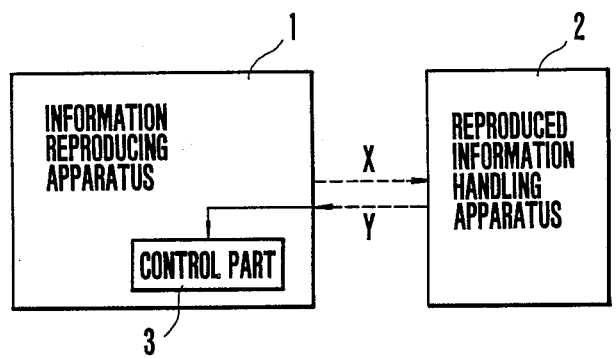
FIG. 1A is a block diagram showing an information reproducing and processing system having an information reproducing apparatus and a reproduced information handling apparatus arranged separately from each other.
Figure 1B:
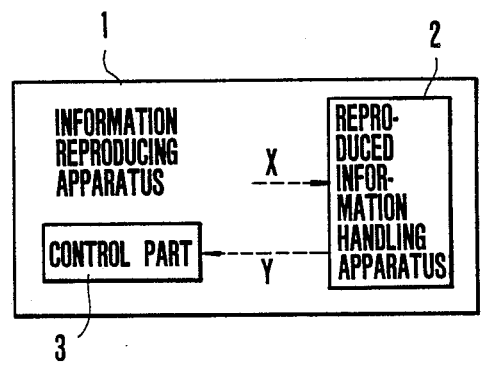
FIG. 1B is a block diagram showing an information reproducing and processing system having an information reproducing apparatus and a reproduced information handling apparatus arranged in one unified body.

DETAILED DESCRIPTION OF THE PREFERRED EMBODIMENTS:

FIGS. 1A and 1B show by way of example two different ways of arranging an information reproducing and processing system embodying the present invention. FIG. 1A shows a case where a reproduced information handling apparatus (hereinafter called a handling apparatus) separated from an information reproducing apparatus (hereinafter called a reproducing apparatus). In the case of FIG. 1B on the other hand, the handling apparatus is arranged as one unit with the reproducing apparatus. Referring to these drawings, the reproducing apparatus 1 is arranged to reproduce information recorded on a recording medium and to supply the reproduced information, for example, to a display device and also to the handling apparatus 2. The handling apparatus 2 is, for example, a printer or an electric transmission device. A system control part 3 is arranged to control the operation of the reproducing apparatus 1 or that of the handling apparatus 2. A signal X represents the reproduced information produced by the reproducing apparatus 1 and is supplied to the handling apparatus 2. Another signal Y is formed to indicate a coupled state of the handling apparatus 2 (indicating whether the handling apparatus is coupled with the reproducing apparatus or not, to indicate a switched-on or switched-off state of power supply or to indicate the operating state of the handling apparatus (indicating, for example, whether the apparatus is in operation or has completed its operation or is inoperative).

Figure 2:
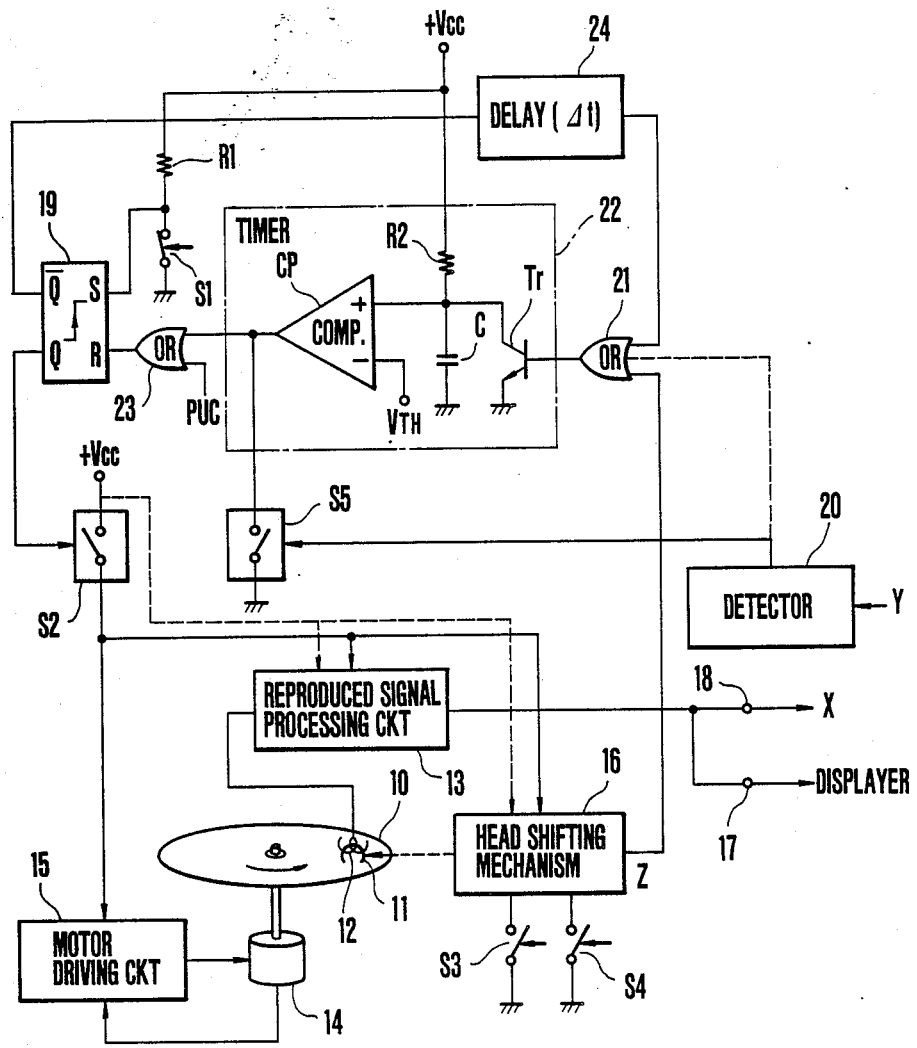
FIG. 2 is a circuit diagram showing an information reproducing apparatus arranged according to the present invention as an embodiment thereof.

The circuit arrangement of an embodiment of the invention is as shown in FIG. 2. In FIG. 2, a reference numeral 10 denotes a magnetic sheet which is employed as recording medium. The embodiment includes a reproducing head 11; a coil 12 which is wound around the reproducing head 11; a reproduced signal processing circuit 13; a sheet rotating motor 14; a motor driving circuit 15; and a head shifting mechanism 16. Under a normal operating condition, the reproduced signal processing circuit 13, the motor driving circuit 15 and the head shifting mechanism 16 are connected to a power source +Vcc through a switch circuit S2. Then, the sheet rotating motor 14 rotates under the control of the motor driving circuit 15. The head shifting mechanism 16 brings the reproducing head 11 into a position opposite a desired recording track on the magnetic sheet 10. Information recorded on the magnetic sheet 10 such as a video signal or the like is picked up by the coil 12 wound around the reproducing head 11. The information or signal thus picked up is processed by the reproduced signal processing circuit 13 and is produced therefrom in the form of the above-stated reproduced information or signal X. The reproduced information X is supplied via an output terminal 17 to a display device which is not shown and is also supplied via another output terminal 18 to the handling apparatus 2. To the head shifting mechanism 16 are connected switches S3 and S4 which are arranged to instruct the forward and backward shift of the reproducing head 11 respectively. In response to the instruction given by the switch S3 or S4, the head shifting mechanism 16 shifts the reproducing head 11 relative to the magnetic sheet 10. The head shifting mechanism 16 is also arranged to produce therefrom a high level pulse signal Z to show the shift of the head during the head shifting operation.

A play switch S1 is connected via a resistor R1 to the power source +Vcc and, in this specific embodiment, is arranged to be normally closed and to be opened by an operation perfromed on a play button which is not shown. There is provided a rise synchronizing type RS flip-flop 19. The set input terminal S of the flip-flop 19 is arranged to receive the potential of a junction point between the resistor R1 and the play switch S1. The reset input terminal R of the flip-flop 19 is connected to the output terminal of an OR gate 23. The output Q of the flip-flop 19 is arranged to be supplied to the switch circuit S2 as a control signal. The switch circuit S2 turns on only when this output Q is at a high level. With the switch circuit S2 turned on, the electric energy from the power source +Vcc is supplied to these circuits and mechanism 13, 15 and 16.

A reference numeral 20 denotes a detector. When the above-stated handling apparatus 2 is connected to the reproducing apparatus or when the connected handling apparatus has power supply turned on or is in operation, the output level of the detector 20 is high. When the connected handling apparatus has power supply turned off or when the operation thereof has been completed, the output level of the detector 20 changes from the high level to the low level. A switch circuit S5 is responsive to the detector 20 and is arranged to turn on when the output of the detector 20 is at the high level. An OR gate 21 is arranged to receive the high level pulse output of the head shifting mechanism 16 and the output of a delay circuit 24 which is arranged to delay the output Q of the flip-flop 19 for a slight period of time $\Delta t$. A reference numeral 22 denotes a timer circuit for restricting the reproducing operation of the reproducing apparatus within a predetermined period of time t. The timer circuit 22 consists of a CR time constant circuit formed by series connection of a resistor R2 which is connected to the power source +Vcc and a capacitor C; a switching transistor Tr arranged to reset the capacitor C; and a voltage comparator CP which is arranged to compare the potential of a junction point between the resistor R2 snd the capacitor C with a predetermined threshold voltage $V_{TH}$, and to produce a high level output therefrom when the potential of the junction point comes to exceed the threshold voltage $V_{TH}$. The output of the voltage comparator CP, i.e. the output of the timer circuit 22, is supplied to the OR gate 23 together with power-up-clear pulses produced from a power-up-clear circuit which is not shown. Then, the output of the OR gate 23 is arranged to be supplied to the reset input terminal R of the flip-flop 19 as mentioned in the foregoing. The above-stated switch circuit S5 is connected between the output terminal of the comparator CP or the timer circuit 22 and a circuit ground. Therefore, when the switch circuit S5 is turned on by the high level output of the detector 20, the output level of the timer circuit 22 is restricted to the low level and the timer circuit 22 is thus disabled thereby. Further, the output terminal of the OR gate 21 is connected to the base of the transistor Tr which is included in the timer circuit 22. Accordingly, the high level output of the OR gate 21 renders the transistor Tr conductive to reset the capacitor C.

With the embodiment arranged as described above, it operates as follows:

Referring to FIGS. 3A and 3B, when the power supply is turned on by means not shown, the power-up-clear output is supplied via the OR gate 23 to the reset input terminal of the flip-flop 19. This forcedly places the flip-flop 19 into a reset state. Under this condition, the output e,ovs/Q/ of the flip-flop 19 becomes high (19-$\bar{Q}$ output in FIGS. 3A and 3B). Therefore, after the lapse of the delay time $\Delta t$ defined by the delay circuit 24, the output level of the OR gate 21 also becomes high. As a result, the transistor Tr becomes conductive to bring the timer circuit 22 into a reset state.

Following that, when an operation on the play button causes the switch S1 to momentarily open, the flip-flop 19 is set because the level of its set input momentarily becomes high. Then, the level of the output Q of the flip-flop 19 becomes high (19-Q output in FIGS. 3A and 3B) while that of its output $\bar{Q}$ becomes low (19-$\bar{Q}$ output in FIGS. 3A and 3B). The high level of the output Q of the flip-flop 19 turns on the switch circuit S2 to have power supply effected from the power source +Vcc to the reproduced signal processing circuit 13, the motor driving circuit 15, the head shifting mechanism 16, etc. Then, a reproducing operation begins.

The output level of the detector 20 is low (20-output in FIG. 3A) when the handling apparatus 2 is not coupled with the reproducing apparatus or when the power supply thereto is off or when the handling apparatus is not in operation. With the output of the detector 20 remaining at the low level under one of such conditions, the switch circuit S5 is off. Under this condition, the embodiment operates as follows: Referring to FIG. 3A, when the head 11 is not shifted, the head shifting mechanism 16 does not produce the high level pulse output Z (16-output pulse Z in FIG. 3A). The output $\bar{Q}$ of the flip-flop 19 is at the low level (19-$\bar{Q}$ output in FIG. 3A) under this condition. Therefore, the output level of the OR gate 21 becomes low. This causes the transistor Tr to turn off to release the capacitor C of the timer circuit 22 from a short-circuited state. The timer circuit 22 thus begins to perform a time counting operation.

In this instance, if, before the lapse of the time t defined by the timer circuit 22, the head shifting mechanism 16 shifts the head 11 and then produces the high level pulse Z (16-output pulse Z in FIG. 3A), the output of the OR gate 21 temporarily becomes high level. The temporarily high level output of the OR gate causes the transistor Tr to temporarily turn on to reset the timer circuit 22.

With the head 11 shifted as mentioned above, if the head 11 is not shifted once more before the lapse of the restricting time t defined by the timer circuit 22 after that, the output level of the timer circuit 22 becomes high (22-output in FIG. 3A) when the time t lapses. Accordingly, the output level of the OR gate 23 becomes high to reset the flip-flop 19. The output Q of the flip-flop 19 thus becomes low (19-Q output in FIG. 3A) and the output $\bar{Q}$ of the flip-flop 19 high (19-$\bar{Q}$ output in FIG. 3A). With the level of the output Q becoming low, the switch circuit S2 turns off. Therefore, power supply to the reproduced signal processing circuit 13, the motor driving circuit 15 and the head shifting mechanism 16 is cut off and the apparatus stops operating. Further, with the level of the output $\bar{Q}$ of the flip-flop 19 becoming high, when after that the delay time $\Delta t$ defined by the delay circuit 24 lapses, the transistor Tr turns on to confine the timer circuit 22 in a reset state.

In case that, after the flip-flop 19 is set with the switch S1 opened, the output level of the detector 20 becomes high (20-output in FIG. 3B) with the handling apparatus 2 connected to the reproducing apparatus, or power supply thereto turned on, or the operation thereof started before the lapse of the time t defined by the above-stated timer circuit 22, the embodiment operates as follows: The high level output of the detector 20 turns the switch circuit S5 on. After the switch circuit S5 turned on, the output level of the timer circuit 22 remains low (22-output in FIG. 3B) irrespective of the lapse of the time t. This condition of course lasts until the output level of the detector 20 becomes low. When the output level of the detector 20 becomes low (20-output in FIG. 3B) as a result of disconnection of the handling apparatus, discontinuance of power supply thereto or completion of the operation thereof, the switch circuit S5 turns off. If, at that point of time, the time t defined by the timer circuit 22 has already lapsed, the output of the timer circuit 22 immediately becomes high (22-output in FIG. 3B). If the time t has not yet been lapsed at that point of time, the output level of the timer circuit 22 becomes high (22-output, FIG. 3B) when the time t elapses. The high level output of the timer circuit 22 then resets the flip-flop 19 and the reproducing apparatus ceases to operate as mentioned above.

In case of a still picture reproducing apparatus, for example, one and the same recording track is continuously and repeatedly traced with the reproducing head 11 until the reproducing head 11 is shifted to another recording track for reproducing another image. This repetitive and continuous tracing operation on the same track tends to damage the magnetic sheet 10 if it continues for a period of time in excess of a certain given length of time. This problem can be solved by presetting a limit length of time t at the timer circuit 22 and by stopping the reproducing operation upon lapse of the time t. In the case of a system arrangement where the handling apparatus is arranged to handle the reproduced signal produced from the reproducing apparatus 1, however, either the handling apparatus 2 is disturbed by such a stopping action on the reproducing apparatus 1 during its operation. This has been a problem with the conventional systems of this kind. Whereas, in accordance with the embodiment of the invention shown in FIG. 2, the handling apparatus 2 can be prevented from being disturbed and yet the magnetic sheet 10 can be also prevented from being damaged by a continuous and repetitive reproducing operation on one and the same recording track.

In the embodiment shown in FIG. 2, the reproducing operation is arranged to be stopped by cutting off power supply by the switch S2. However, instead of this arrangement, the reproducing operation may be arranged to be stopped by moving upward or downward the magnetic reproducing head 11 or the magnetic sheet 10 or the sheet rotating motor 14 which rotates the magnetic sheet 10 to change the distance between the head 11 and the sheet 10. It is also possible to provide a delay circuit or a second timer circuit between the detector 20 and the switch circuit S5 and to stop the reproducing operation when a predetermined period of time elapses after receipt of a disconnection signal, a power supply switched-off signal or an operation completion signal from the detector 20. In another possible method, the switch circuit S5 is omitted and the output of the detector 20 is arranged to be supplied to the OR gate 21 as shown by a broken line in FIG. 2. In the case of this method, the time counting operation of the timer circuit 22 begins after the output level of the detector 20 becomes low and comes to stop after the lapse of the predetermined time t.

The power supply control by the switch S2 may be arranged to be performed solely for the motor driving circuit 15. And, as shown by a broken line in FIG. 2, power supply to the reproduced signal processing circuit 13 and the head shifting mechanism 16 may be arranged to be effected not via the switch circuit S2. The detector 20 may be arranged as shown in FIGS. 4A–4C.

Figure 4A:
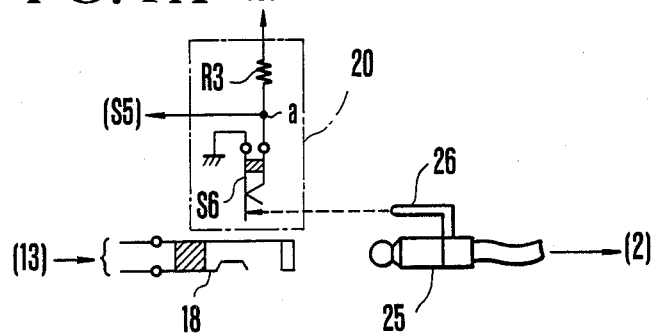
FIG. 4A is a partial diagram showing by way of example, together with an example of a coupling arrangement, a detector shown in FIG. 2 as in a state of being arranged to detect whether or not the reproduced information handling apparatus is coupled with the information reproducing apparatus.

In the example shown in FIG. 4A, the detector 20 is arranged to detect whether the handling apparatus 2 is coupled with the reproducing apparatus 1. The detector 20 in this example includes series connection of a normally closed type mechanical switch S6 and a resistor R3 connected between the power source +Vcc and the circuit gound. The switch S6 is disposed close to the output terminal 18 of the reproduced signal processing circuit arranged in the form of a plug-in type receptacle. On the other hand, on the side of the handling apparatus 2, there is provided a plug 25 which serves as coupling means. The plug 25 is provided with a protruding member 26. When the plug 25 is coupled with the output terminal or receptacle 18, the switch S6 of the detector 20 is opened by this protrudent member 26. With the switch S6 thus opened, the potential of a junction point "a" between the resistor R3 and the switch S6 changes from the low level to the high level. When the plug 25 is disengaged from the terminal or receptacle 18, the switch S6 closes by itself. The potential of the junction point "a" then changes to the low level. In this example, the potential of the junction point "a" is arranged to be supplied as the output of the detector 20 to the switch circuit S5 of FIG. 2.

Figure 4B:
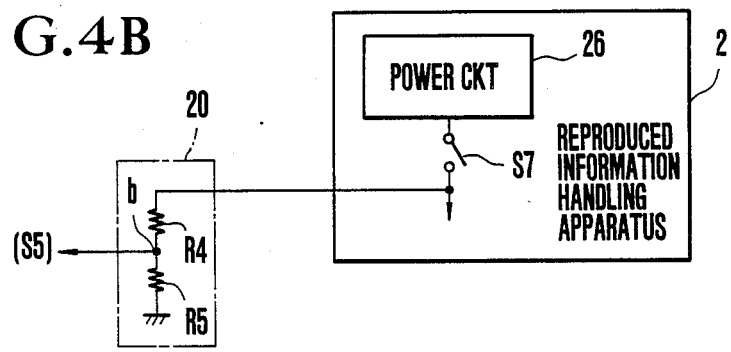
FIG. 4B is a partial diagram showing by way of example, together with related arrangement of the reproduced information handling apparatus, the detector shown in FIG. 2 as in a state of being arranged to detect a switched-on or switched-off state of power supply to the reproduced information handling apparatus.

FIG. 4B shows another example where the detector 20 is arranged to detect the switched on or switched off state or power supply arranged on the side of the handling apparatus 2. The detector 20 in this example includes a series connection of resistors R4 and R5. The resistor R5 is connected to the circuit ground. The resistor R4 is connected to an internal power switch S7 which is connected to the internal power circuit 26 of the handling apparatus 2. Accordingly, when the power switch S7 of the handling apparatus 2 is closed to effect power supply to an internal processing circuit from the power circuit 26, the detector 20 also receives power supply. Then, the potential at a junction point "b" between the resistors R4 and R5 becomes level. The level of the potential at the junction point "b" of course becomes low when the switch S7 opened. In this example, the potential of the junction point "b" is arranged to be applied to the siwtch circuit S5 in FIG. 2 as the output of the detector 20.

Figure 4C:
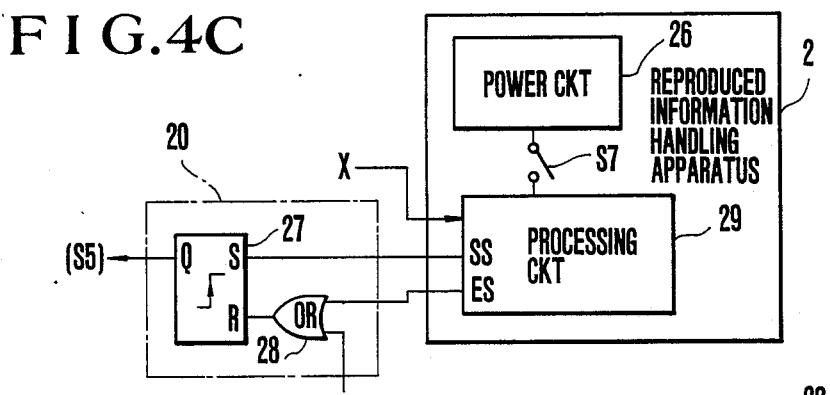
FIG. 4C is a partial diagram showing by way of example, together with related arrangement of the reproduced information handling apparatus, the detector shown in FIG. 2 as in a state of being arranged to detect the operative or inoperative state of the reproduced information handling apparatus.

Lastly, FIG. 4C shows an embodiment where the detector 20 is arranged to detect the start and the end of the handling operation of the handling apparatus 2. The detector 20 in this example includes an RS flip-flop 27 and an OR gate 28 which is connected to the reset input terminal R of the flip-flop 27. On the other hand, on the side of the handling apparatus 2, a processing circuit 29 is arranged to produce a start signal SS when it begins to operate and an end signal when it ceases to operate. The detector 20 is arranged to receive the start signal SS from the processing circuit 29 at the set input terminal S of the flip-flop 27 and the end signal ES at the first input terminal of the OR gate 28. A power-up-clear pulse PUC is applied to the second input terminal of the OR gate 28 of the detector 20. With the detector 20 arranged in this manner, the flip-flop 27 is reset without fail by the power-up-clear pulse PUC. After that, at the start of the processing operation of the processing circuit 29 on the side of the handling apparatus 2, the flip-flop 27 is set by the start signal SS. The level of the output Q of the flip-flop 27 then changes from the low level to the high level. At the end of the processing operation of the processing circuit 29 of the handling apparatus 2, the flip-flop 27 is reset by the end signal ES. The output Q of the flip-flop 27 then comes back from the high level to the low level. The level of the output Q of the flip-flop 27 thus remains high throughout the operation of the processing circuit 29. In this embodiment, the output Q of the flip-flop 27 is applied to the swith circuit S5 of FIG. 2 as the output of the detector 20.

Figure 5:
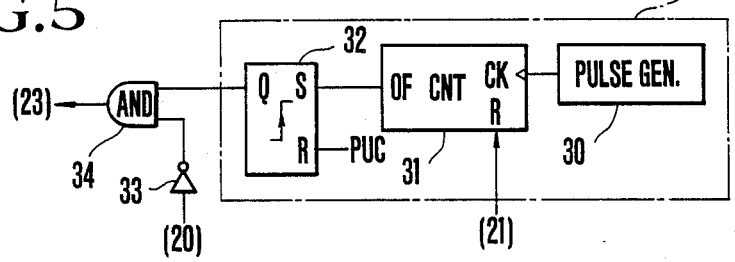
FIG. 5 is a partial circuit diagram showing another example of arrangement of the timer circuit shown in FIG. 2.

In the embodiment shown in FIG. 2, the timer circuit 22 is an analog timer consisting of a CR time constant circuit and a voltage comparator. However, the timer circuit 22 of course can be arranged as a digital timer using a digital counter. One example of such a digital timer is as shown in FIG. 5. Referring to FIG. 5, the timer circuit 22 in this example includes a pulse generator 30 arranged to produce timing pulses at predetermined intervals; a presettable counter 31 arranged to count the timing pulses produced from the pulse generator 30; and an RS flip-flop 32 arranged to be reset by a power-up-clear pulse and to be set by an overflow signal produced from the counter 31. The counter 31 is arranged to be preset by the high level output of the OR gate 21 of FIG. 2 and, after that, to count the timing pulses from the pulse generator 30 when the output level of the OR gate 21 becomes low to enable the counter 31 to count. When a number of the pulses corresponding to the above-stated predetermined period of time t have been counted, the counter 31 comes to produce the overflow signal. Therefore, the flip-flop 32 is set and the output Q thereof changes from the low level to the high level when the predetermined period of time t elapses after the counter 31 is enabled to count. This output Q is of course used as the output of the timer circuit.

Further, in the example shown in FIG. 5, the switch circuit S5 of FIG. 2 is replaced with a combination of an inverter 33 arranged to invert the output of the detector 20 and an AND gate 34 arranged to receive the output of the inverter 33 and that of the timer circuit 22. The output of the AND gate 34 is applied to the OR gate 23 in FIG. 2. However, this arrangement in FIG. 5 is funtionally identical with the arrangement of the above-stated switch circuit S5. It goes without saying, therefore, that the combination of the inverter 33 and the AND gate 34 is usable in place of the switch circuit S5 in the embodiment shown in FIG. 2.

The above-stated timer circuit 22 may be arranged as either a discrete circuit or a timing device included in the central processing unit (CPU) of the system control part 3 (see FIGS. 1A and 1B) may be used as the timer circuit 22. In the latter case, the output terminal of the detector 20 is connected directly to the central processing unit.

While an embodiment of applying the present invention to a magnetic sheet type reproducing apparatus has been described in the foregoing, the invention is also applicable to other systems. For example, the invention can be advantageously applied to a system wherein a video tape player can be set in a still picture reproducing mode and is arranged to cooperate with a reproduced information handling apparatus in that mode. Therefore, it goes without saying that the invention is not limited to the arrangement of the specific embodiment described.

What I claim:

1. An information reproducing apparatus for reproducing information respectively recorded in a plurality of regions on a record bearing medium, comprising:
    (a) a reproducing head for tracing one recording track out of a plurality of recording tracks formed on said record bearing medium, said recording head being able to reproduce the information recorded on said recording tracks;
    (b) a reproducing head shifting mechanism for shifting said reproducing head relative to said plurality of recording tracks;
    (c) time measuring means for measuring a time of continuation of a tracing operation after the tracing operation effected by said reproducing head with respect to one of a plurality of recording tracks formed on said bearing medium has started and for outputting an arrival signal when the measured time has arrived at a predetermined value;
    (d) tracing operation control means for interrupting the tracing operation effected by said reproducing head in synchronism with the timing when said arrival signal is outputted from said measuring means; and
    (e) measuring operation control means for resetting the measuring operation effected by said time measuring means in a case where said reproducing head is shifted to another recording track on said record bearing medium by said recording head shifting mechanism when a predetermined time has elapsed after starting of the tracing operation effected by said reproducing head with respect to one of the plurality of recording tracks formed on said record bearing medium.

2. An apparatus according to claim 1, wherein said record bearing medium includes a magnetic record bearing medium and said reproducing means includes a magnetic head.

3. An information processing apparatus for reproducing information respectively recorded at a plurality of regions on a record bearing medium, and processing the reproduced information at a first information processing part, comprising:
    (a) a reproducing head for reproducing information recorded on one recording track out of a plurality of recording tracks formed on said record bearing medium;
    (b) moving means for moving said record bearing medium relative to said reproducing head;
    (c) reproducing head shifting means for shifting said reproducing head relative to said one recording track out of the plurality of recording tracks;
    (d) supply means capable of supplying an information signal reproduced by said reproducing head from one of the plurality of recording tracks formed on said record bearing medium to said first information processing part;
    (e) counting means for counting a time duration of the reproducing operation by said reproducing head of said one recording track on said record bearing medium, and for producing an arrival signal in synchronism with a timing with which the counted time duration reaches a predetermined value;
    (f) stopping instruction signal producing means for producing an instruction signal for stopping the movement of said record bearing medium by said moving mechanism in synchronism with a timing with which the arrival signal is produced by said counting means; and
    (g) inhibition indicating means for inhibiting generation of said stopping instruction signal when the information signal ouputted from said reproducing head is being supplied to said first information processing part by said supplying means.

4. An apparatus according to claim 3, wherein said record bearing medium includes a magnetic disc and said reproducing head includes a magnetic head.

5. An apparatus according to claim 4, wherein said moving means includes a rotation driving motor for rotating said magnetic disc relative to said magnetic head, as well as a power source, and further includes a rotation driving motor restricting circuit for restricting the rotation driving operation of said rotation driving motor; said stopping instructing signal producing means producing a stopping instruction signal, to stop a rotation of said rotation driving motor, for said rotation driving motor restricting circuit.

6. An information processing apparatus for reproducing information respectively recorded at a plurality of regions on a record bearing medium, and processing the reproduced information at a first information processing part, comprising:
    (a) a reproducing head for reproducing information recorded on one recording trck out of a plurality of recording tracks formed on said record bearing medium;
    (b) moving means for moving said record bearing medium relative to said reproducing head;
    (c) reproducing head shifting means for shifting said reproducing head relative to said one recording track out of the plurality of recording tracks;
    (d) supplying means for supplying an information signal reproduced by said reproducing head from one of the pluarlity of recording tracks formed on said record bearing medium to said first information processing part;
    (e) counting means for counting a time duration of the reproducing operation of said one recording track on said record bearing medium by said reproducing head, and for producing an arrival signal in synchronism with a timing with which the counted time duration reaches a predetermined value;

(f) shifting instruction signal producing means for producing an instruction signal for said reproducing head shifting means for shift said reproducing head relative to said one recording track out of said plurality of recording tracks in synchronism with a timing with which the arrival signal is produced by said counting means; and (g) inhibition indicating means for inhibiting generation of said instruction signal to said shift instruction signal producing means when the information signal outputted from said reproducing head is being supplied to said first information processing part by said supply means.

7. An apparatus according to claim 6, wherein said record bearing medium includes a magnetic disc and said reproducing head includes a magnetic head.

8. An information processing system for reproducing information respectively recorded on a plurality of regions on a record bearing medium by a reproducing apparatus and further processing the reproduced information at a first information processing apparatus, comprising:

(A) a reproducing apparatus comprising:

(a) reproducing means for reproducing information from one region out of said plurality of regions on said record bearing medium;

(b) output means for outputting the information reproduced from said one region on said record bearing medium by said reproducing means for said first information processing apparatus;

(c) counting means for counting a time duration of a reproducing operation after the reproducing operation is started by said reproducing means on the one region of said record bearing medium, and producing an arrival signal when the counted time duration reaches a predetermined value;

(d) reproducing operation restricting means for stopping the reproducing operation by said reproducing means in synchronism with a timing with which said arrival signal is produced from said counting means; and (B) a first information processing apparatus comprising:

(a) input means for receiving the information produced from said output means of said reproducing apparatus;

(b) processing means for processing the information received by said input means; and (c) instruction means for outputting a restriction inhibiting signal for inhibiting a restriction operation of said reproducing operation restriction means in synchronism with the timing of starting the processing operation of said processing means, for measuring a period of time elasped from starting of the processing operation by said processing means and stopping an output of said restriction inhibiting signal in synchronism with a timing with which the counted time reaches a predetermined value.

9. A system according to claim 8, wherein said first information processing apparatus includes a printer device.

10. A system according to claim 8, wherein said first information processing apparatus includes a facimile device.

* * * * *